United States Patent [19]

Held

[11] 4,283,246

[45] Aug. 11, 1981

[54] CONTINUOUS LAMINATING MACHINE

[76] Inventor: Kurt Held, Alte Strasse 1, D-7218 Trossingen 2, Fed. Rep. of Germany

[21] Appl. No.: 114,673

[22] Filed: Jan. 23, 1980

[30] Foreign Application Priority Data

Aug. 20, 1977 [DE] Fed. Rep. of Germany ....... 2737629

[51] Int. Cl.³ .............................................. B30B 5/06
[52] U.S. Cl. ................................ 156/555; 100/93 RP; 100/154; 156/580; 156/583.5; 425/371
[58] Field of Search ..................... 156/555, 580, 583.5; 100/93 RP, 151, 154; 425/371

[56] References Cited

U.S. PATENT DOCUMENTS

| 2,142,932 | 1/1939 | Beard | 100/154 |
| 3,064,590 | 11/1962 | Thiele | 425/371 |
| 3,120,862 | 2/1964 | Burger | 100/154 |
| 3,851,685 | 12/1974 | Ahrweiler | 100/154 |

FOREIGN PATENT DOCUMENTS

| 176349 | 3/1953 | Fed. Rep. of Germany . |
| 1004368 | 3/1957 | Fed. Rep. of Germany . |
| 327433 | 1/1958 | Fed. Rep. of Germany . |
| 2058820 | 11/1970 | Fed. Rep. of Germany . |
| 2205575 | 8/1973 | Fed. Rep. of Germany . |
| 2215618 | 10/1973 | Fed. Rep. of Germany . |
| 2157746 | 2/1975 | Fed. Rep. of Germany . |
| 2343437 | 3/1975 | Fed. Rep. of Germany . |
| 2737629 | 2/1979 | Fed. Rep. of Germany . |
| 1469225 | 12/1965 | France . |

Primary Examiner—Michael G. Wityshyn
Attorney, Agent, or Firm—Spencer & Kaye

[57] ABSTRACT

In a continuous laminating machine for exerting a pressure over an area on a moving panel of material, which machine includes a stationary supporting structure composed of two supporting elements, each supporting element presenting a parallel pair of planar outer faces and semicylindrical outer end faces extending between the planar faces, two steel pressing belts each supported by a respective supporting element and each disposed to press against a respectively opposite side of such a panel in the region of one planar outer face of a respective supporting element for applying such pressure thereto, bearing elements providing a rolling bearing between each pressing belt and its respective supporting element, and clamping plates connecting the supporting elements together, the bearing elements include a plurality of cylindrical rolling elements and a plurality of spacer profiles alternating with the rolling elements and provided with arcuate recesses adapted to the configuration of the rolling elements so that each spacer profile forms a slide bearing cup for one side of an adjacent one of the rolling elements, the rolling elements and spacer profiles being disposed between each pressing belt and its respective supporting element such that the compression reaction forces produced by such a panel are transferred from the rolling elements under the influence of rolling friction to the supporting elements and into the clamping plates.

5 Claims, 6 Drawing Figures

FIG. I

CONTINUOUS LAMINATING MACHINE

BACKGROUND OF THE INVENTION

In the construction of a laminating machine which is to operate according to the double belt principle for the production of a pressure across a flat plane upon an area of a continuously moving panel of material, one is faced with the task of minimizing the friction forces occurring between the moving flexible steel belts and the stationary supporting structure which absorbs the reaction forces. Essentially two measures have become known as a solution to this problem: the arrangement of rolling elements between the steel belt and the supporting structure; and the arrangement of outwardly sealed pressure chambers filled with fluid pressure medium at the same locations. Some other, different, attempts at solving the problem have not achieved any significant acceptance in industry.

In the prior art solution proposals employing the arrangement of rolling elements, e.g. German offenlegungsschriften [Laid-open applications] Nos. 2,058,820, 2,343,437 and 2,215,618 and German Auslegeschriften [Published Applications] Nos. 2,157,746 and 1,004,368, it has been found difficult to keep short, or to sufficiently support, the belt region between the tangent contact point at the guide rollers at which the steel belts come into contact with or leave the guide rollers, respectively, and the reaction zone in which pressure is exerted on the backside of the belt.

This so-called dangerous entrance zone creates considerable limitations in use, depending on the material to be processed, for example higher belt temperatures for the manufacture of laminates of paper panels saturated with aminoplasts. Since no pressure can be exerted on the panel of material in the dangerous entrance zone, the saturating resins condense too early and the surfaces can no longer be compressed without pores in the subsequent reaction zone.

In prior art arrangements utilizing rod-shaped rollers which extended over the entire width of the belt, as disclosed in French Pat. No. 1,469,225 and Austrian Pat. No. 176,349, the rollers were to be guided outside of the pressure load zone, or several in juxtaposition within the pressure load zone, by means of sprocket chains whose individual links connected the pin-shaped ends of the rollers and kept them spaced apart. A significant drawback of this arrangement is the danger of serious damage to the machine if only a single one of the many parts of such a chain breaks and is crushed between the rolls.

In the case of panels of material which require extensive compression, such as, e.g., randomly distributed chips, their tendency to spring back is annoying, especially in combination with the fact that, for such applications in particular, long dangerous entrance zones are characteristic of all prior art solutions. This is the case for the systems disclosed in German Offenlegungsschriften Nos. 2,058,820 and 2,205,575, which are mentioned in this connection only to aid in understanding the nature of the difficulty.

Generally, rolling element belts and rolling element chains constitute known solutions to the problem of reducing friction between the moving pressing belt and the stationary supporting structure of such a machine. In particular, German Offenlegunsgschrift No. 2,215,618 makes suggestions to overcome the problems that occur. This publication also does not recognize the problem of a long entrance zone. Moreover, it presents no suggestions for reliably maintaining uniform spacing between the rod-shaped rolling elements, except for the already known technique of providing lateral guide members in the form of a chain. The same applies for French Pat. No. 1,469,225 and Swiss Pat. No. 327,433. Although this Swiss patent discloses a way of avoiding the dangerous entrance zone which, according to the descriptive text, has obviously not been recognized as such, it provides no teaching, except for a mention of the sprocket chain, of how to obtain reliable and wear-free operation with minimum supporting widths.

SUMMARY OF THE INVENTION

It is an object of the present invention to provide a machine which is free of the above-mentioned drawbacks.

A further object of the invention is to reduce the cost of construction of such a machine.

Other objects of the invention are to provide the advantages to be described below.

These and other objects are achieved, according to the present invention, in a continuous laminating machine for exerting a pressure over an area on a moving panel of material, which machine includes a stationary supporting structure composed of two supporting elements, each supporting element presenting a parallel pair of planar outer faces and semicylindrical outer end faces extending between the planar faces, two steel pressing belts each supported by a respective supporting element and each disposed to press against a respectively opposite side of such a panel in the region of one planar outer face of a respective supporting element for applying such pressure thereto, bearing means providing a rolling bearing between each said pressing belt and its respective supporting element, and clamping plates connecting the supporting elements together, by constituting the bearing means of a plurality of cylindrical rolling elements and a plurality of spacer profiles alternating with the rolling elements and provided with arcuate recesses adapted to the configuration of the rolling elements so that each spacer profile forms a slide bearing cup for one side of an adjacent one of the rolling elements, and by disposing the said rolling elements and spacer profiles between each pressing belt and its respective supporting element such that the compression reaction forces produced by such a panel are transferred from the rolling elements under the influence of rolling friction to the supporting elements and into the clamping plates.

DESCRIPTION OF THE PREFERRED EMBODIMENTS

Figure 1:
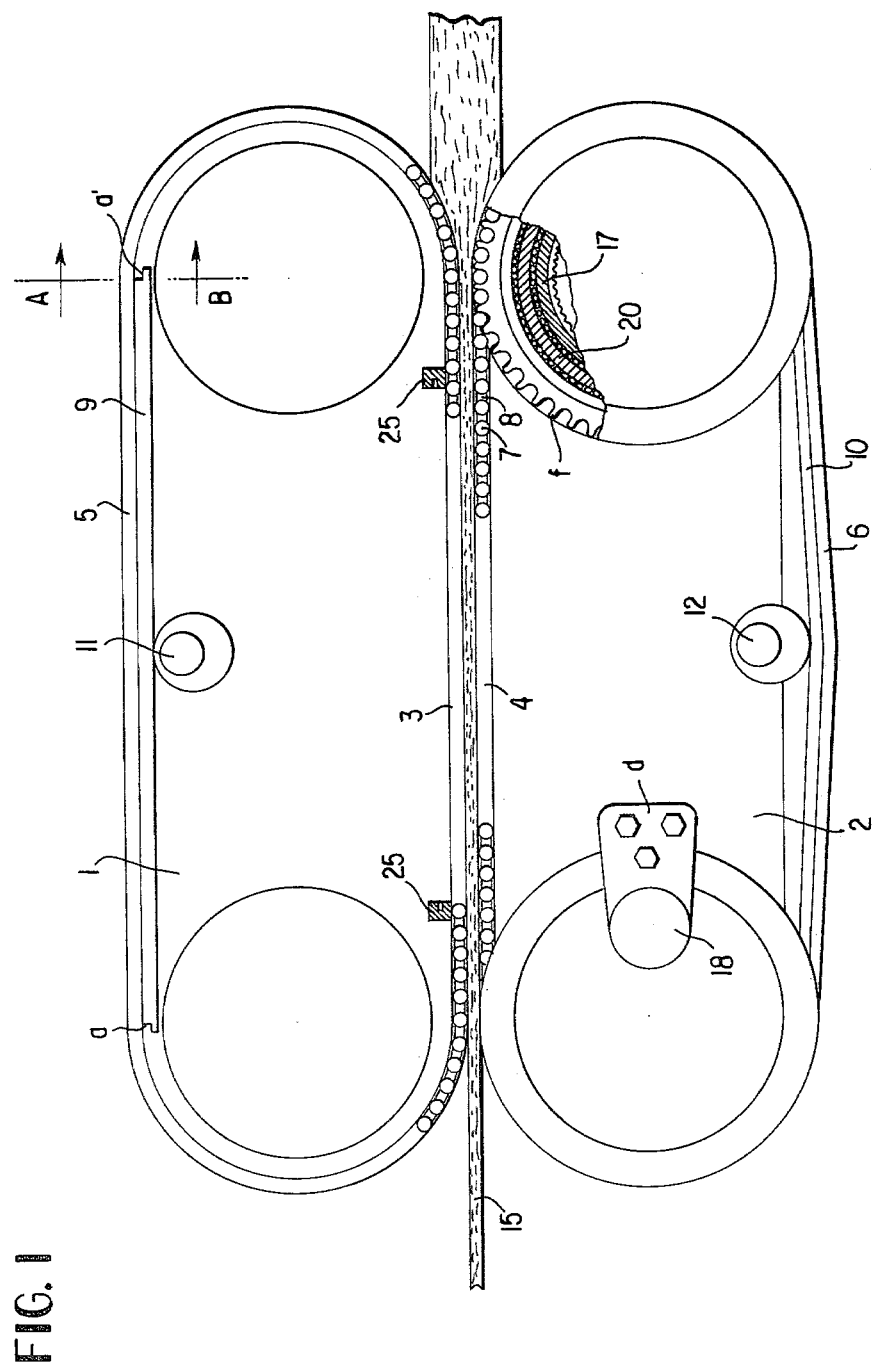
FIG. 1 is a partly cut-away, side elevational view of a first embodiment of a laminating machine according to the invention.

FIG. 1 shows the basic components of a continuous laminating machine composed of two supporting elements 1 and 2 having partly semicylindrical and partly planar outer faces which are hardened and finely worked or are covered with respective steel belts 3 and 4, as the stationary running surface for rolling elements. Further, likewise hardened steel belts 5 and 6 are each pushed over a respective one of the supporting elements 1 and 2. Belts 5 and 6 each have a length which is so selected that thin rod-shaped rolling elements 7 alternating with spacer members 8 can be installed along the periphery of elements 1 and 2 in the spaces between belts or surfaces 3 and 4, on the one hand, and steel belts 5 and 6, on the other hand. The belt structure is shown in greater detail in FIG. 2.

In order for the steel belts 5 and 6 to be tensioned and for expansion due to material fatigue to be compensated, plates 9 and 10 are arranged in the outer faces of supporting elements 1 and 2, respectively, in such a manner that they can be displaced outwardly at a and a' in the supporting elements 1 and 2, respectively, via eccentrically disposed tensioning means 11 and 12, respectively.

Figure 4:
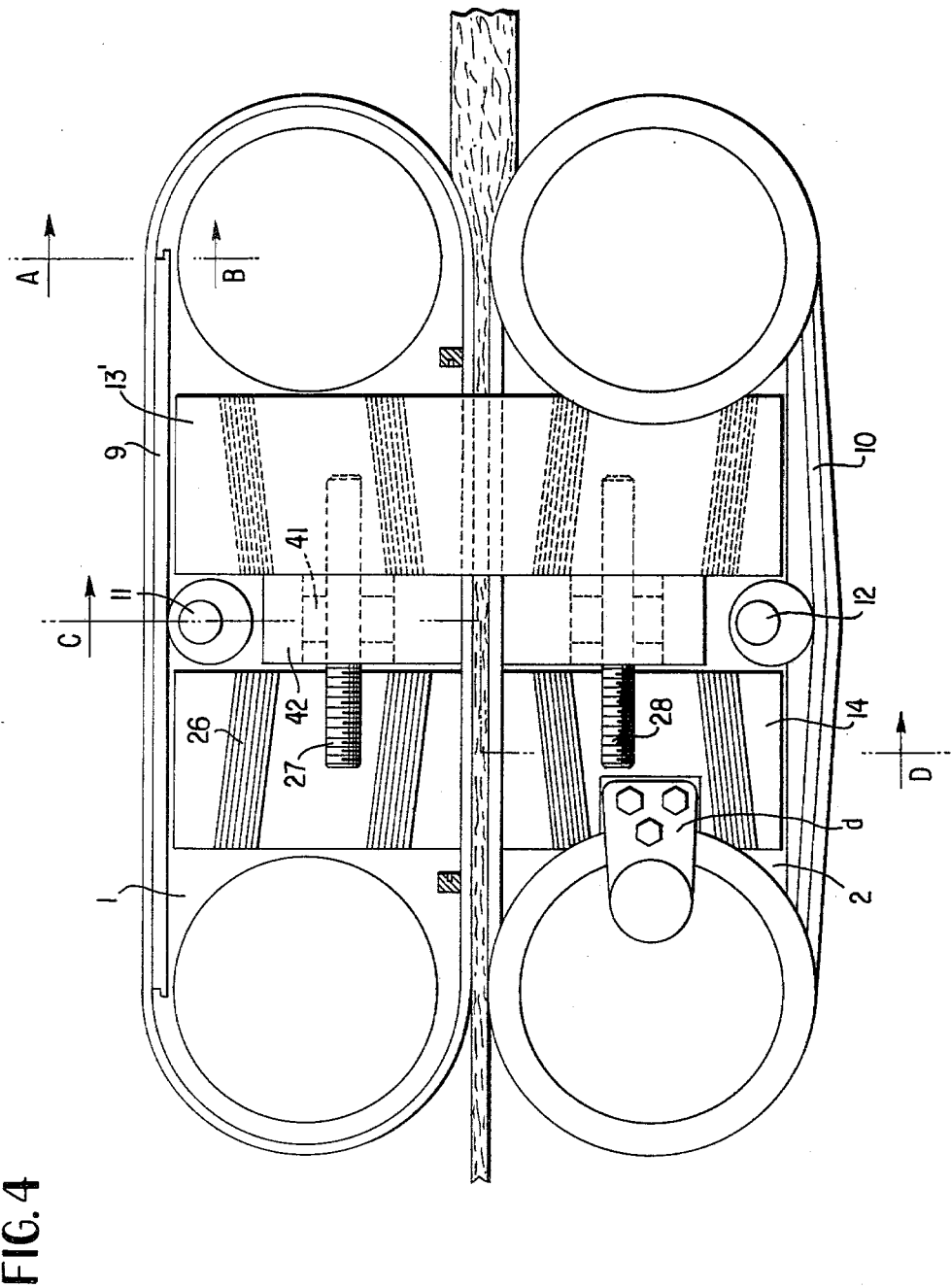
FIG. 4 is a side view of one specific form of construction of the machine of FIG. 1.
Figure 5A:
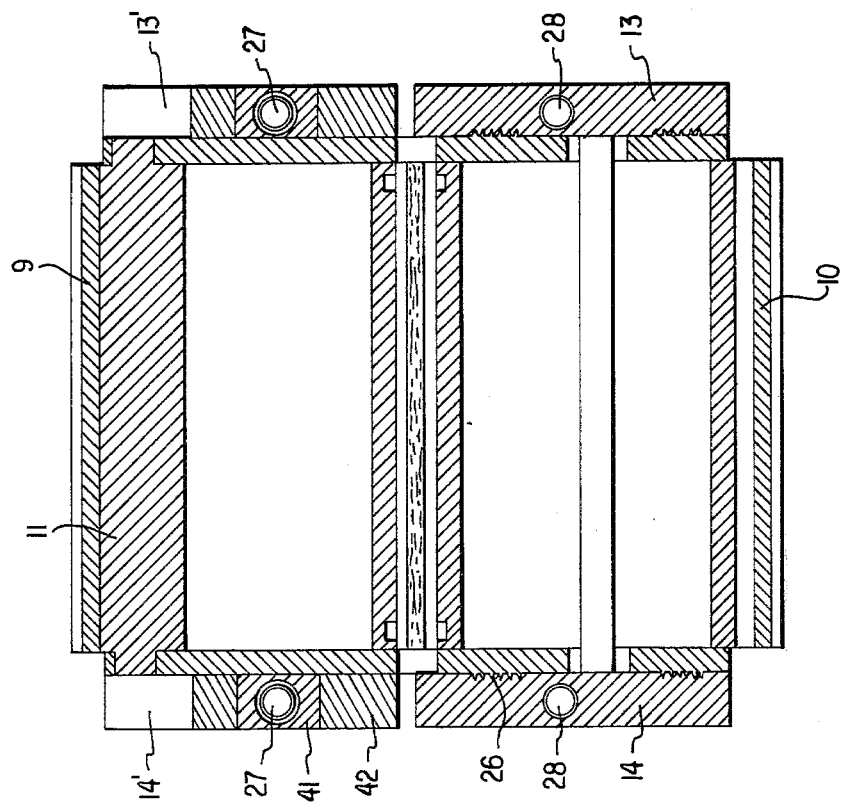
FIG. 5a is a cross-sectional view taken along line C–D of FIG. 4.

If the supporting elements 1 and 2 are connected together via clamping plates 13, 13', 14 and 14', as shown in FIG. 4 and the cross-sectional view of FIG. 5, and the steel belts 5 and 6 are both driven in the same sense with respect to the reach of each belt which rests on a respective side of a panel of material 15 to be compressed, a pressure is exerted on this panel of material 15, the magnitude of which pressure depends on the compression resistance of the material. If, additionally, the supporting elements 1 and 2 are heated, the heat available there is transmitted via the rolling elements 7 and the spacer profiles 8 into the steel belts 5 and 6 and from there into the panel of material 15.

Figure 3:
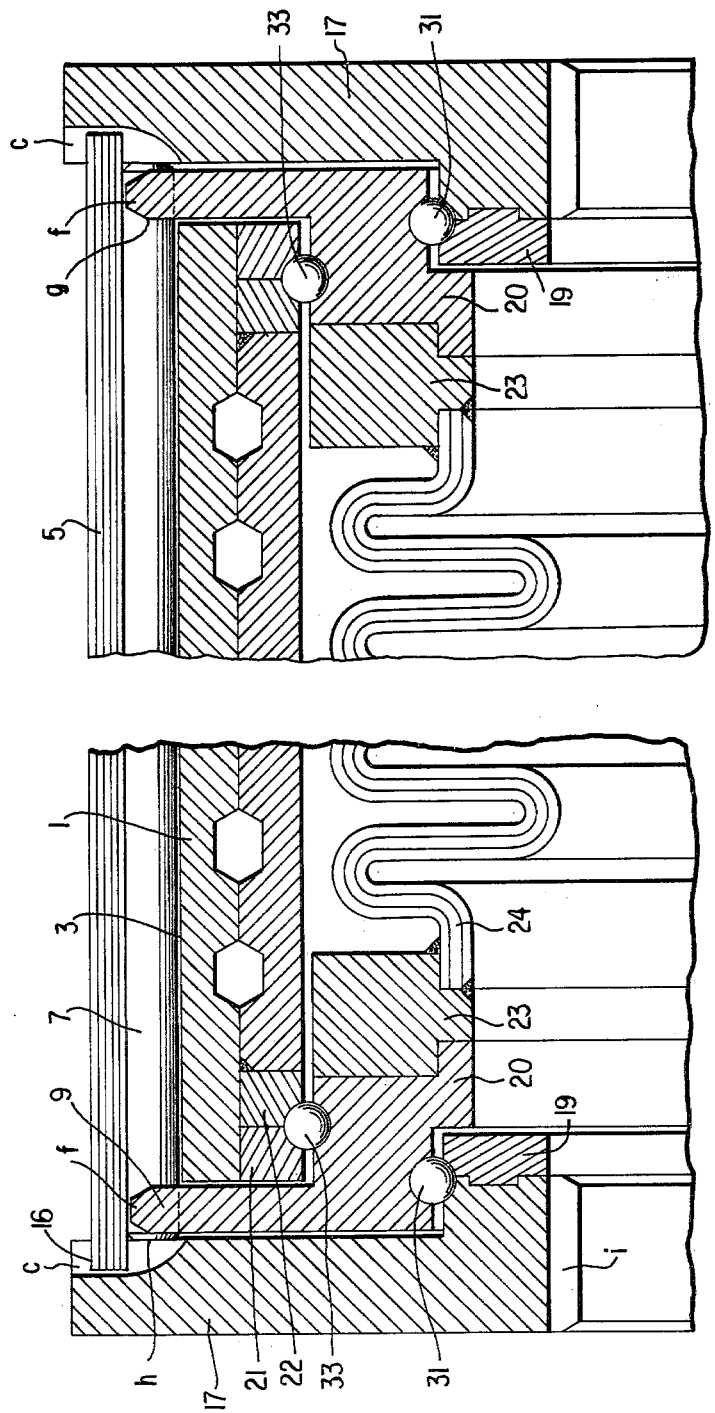
FIG. 3 is a cross-sectional view, along line A–B of FIG. 1, of the lateral extremities of one belt member of the machine of FIG. 1.

In order for the drive to make reliably available the friction forces, which are not insignificant in spite of the anti-friction bearing arrangement of the steel belts, as well as the deformation forces when the panel of material enters the machine, there is provided according to the present invention as shown in FIG. 3, an arrangement of teeth 16 at the side edges of each of the steel belts 5 and 6 which mesh at c with the frontal teeth of a hollow toothed wheel 17. Such hollow toothed wheels are disposed, depending on design requirements, at up to all eight hemispherically curved belt edges of the machine. A drive motor 18, which is shown as an example in FIG. 1 only at location d of the supporting body 2, provides the torque required to move the steel belts. Motor 18 is coupled to internal teeth i of one of the wheels 17 and that wheel drives, via its frontal teeth, the edge of an associated steel belt. Additional drive motors may be associated with other wheels 17 if required.

Each hollow toothed wheel 17 has a guide ring 19 fastened thereto and the wheel and ring form the inner race of a large ball bearing along which balls 31 move in the guide path of a toothed ring 20 forming its outer race.

The toothed ring 20 is provided with teeth f at its outer edge arranged and shaped to accommodate the rolling elements 7. For this purpose, rolling elements 7 protrude laterally beyond the edge of the steel belts 5 and 6 and are centered axially by contact faces h provided at the hollow toothed wheels 17, between the frontal teeth thereof. The spacing profiles 8, not shown in FIG. 3, are centered axially between abutment faces g presented by the teeth f of the toothed rings 20.

At its smaller outer periphery, each toothed ring 20 constitutes the inner race of a further large ball bearing having an outer race 21, 22 installed in the associated supporting element 1 or 2 so as to be concentric with the semicylindrical outer faces of the supporting element. Thus, two such ball bearings are provided at each of the two side faces of each supporting element. Balls 33 are held in rolling engagement by the inner race presented by ring 20 and the outer race 21, 22.

At each longitudinal end of each supporting element, two of the toothed rings 20 are disposed at opposite sides of the associated pressure belt travel path. These rings are fastened to respective centering flanges of a form-locking, or positive-holding, connecting member 24, such as a metal sleeve or bellows, which maintains rings 20 in a predetermined angular position relative to one another so that the gaps between teeth f remain in alignment and rolling elements 7 are thus maintained at a precise right angle to the toothed edges of the steel belts 5, 6 or to the side edges of the supporting elements 1, 2, respectively, and thus also at a right angle to the direction of movement of the belts.

If a rotational force is applied to the internal teeth i of a hollow wheel 17, the hollow wheel is able to rotate, independently of the toothed ring 20, which rotates at half the speed of wheel 17 and is carried along by the rolling elements 7 disposed in the gaps between teeth f.

In order for this type of machine to be used for press processing elastic as well as inelastic panels of material, the planar region of the reaction zone formed between the steel belts, for producing a reaction force between the outside of the supporting element 1 and/or 2 and the rearside of the associated inner steel belt 3 and/or 4, is hermetically sealed from the outside by rubber elastic sealing means 25 extending around the border of the compression region and in that region deformations experienced by the supporting elements, as a result of bending forces, differences in thickness of inelastic panels of material and geometric inaccuracies of the machine parts, are compensated by a fluid pressure medium.

Figure 2:
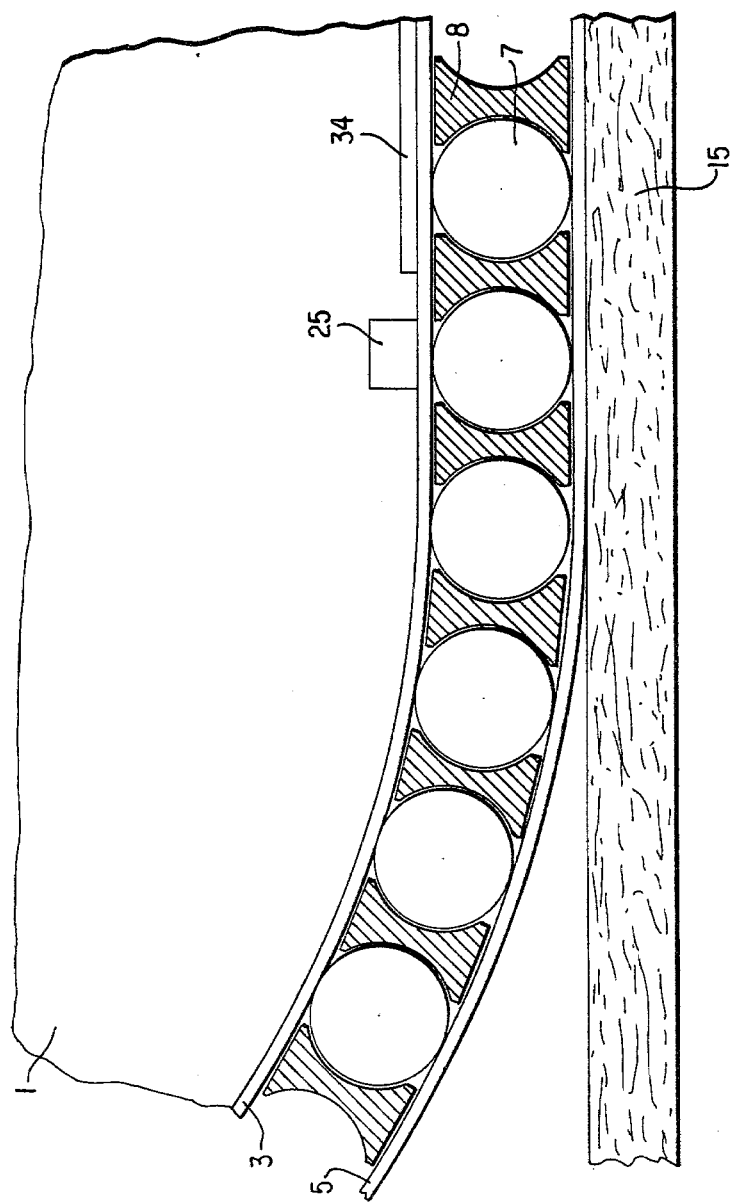
FIG. 2 is a side elevational cross-sectional detail view of a portion of the machine of FIG. 1.

An arrangement for producing this effect is shown in FIG. 2 where a seal 25 in supporting element 1 extends in the form of a rectangular frame around the compression region and a recess 34 is provided in the supporting element in the region enclosed by seal 25. This recess 34 is substantially coextensive with the compression region, and is arranged to be supplied with a liquid or gaseous pressure medium to cause a uniform pressure to be exerted against belt 3 over substantially the entire compression region. A similar arrangement can be provided in supporting element 2 to cooperate with belt 4.

Referring to FIGS. 4 and 5, if the supporting elements 1 and 2 are connected together by clamping plates 13, 13', 14 and 14', each of which extends over substantially the entire height of the two supporting elements, it must be possible to adjust the machine for different panel thicknesses as well as to easily replace the steel belts. For this purpose, two clamping plates 13 and 13' or 14 and 14', respectively, are disposed at each lateral side of supporting elements 1 and 2 to be connected together, and each plate is provided with sawtooth grooves 26 worked into the faces contacting the supporting elements. Grooves 26 are inclined to the normal to the pressing force at an angle approximately equal to the angle of friction and engage in matching counter profiles, or ridges, 26 in the supporting elements 1 and 2 to be influenced by clamping means (not shown) either slidingly or clampingly as desired.

In FIG. 4, clamping plate 13 has been removed and the lateral walls of supporting elements 1 and 2 have been removed, to permit the grooves 26 in plate 14 to be seen. As FIG. 4 shows, plate 14 can be provided with a cutout to receive the mounting for a motor 18. Plate 13 can be similarly cut out.

Figure 5B:
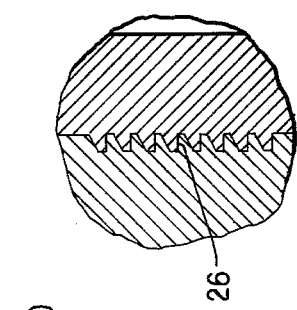
FIG. 5b is a detail view of a region of the structure of FIG. 5a, to an enlarged scale.

FIG. 5b shows, in detail, the configuration of the grooves 26 in the lower region of clamping plate 14 and in the associated side wall of supporting element 2.

If oppositely inclined sawtooth profiles are provided for the two clamping plates at the same side of the machine, and spindles 27 and 28 oppositely threaded at their two ends are threaded in the clamping plates, rotation of spindles 27 and 28 by a positively connected drive will vary the gap thickness between the pressing belts 5 and 6 over a continuous range while keeping the forward reaches of those belts parallel, if the above-mentioned clamping means are out of action. With unilaterally actuated clamping means, the unclamped pair of clamping plates can be removed and the steel belts can be dismounted.

Each spindle 27 and 28 may be mounted in an associated bearing block 41 held in a support 42 secured to an associated supporting element 1 or 2. The spindles can be driven in any suitable manner, as by drive chains extending through lateral openings in bearings 41.

A continuous laminating machine constructed according to the present invention has an intake zone in which the deformation faces are supported almost ideally. With heat sensitive panels of material, heat contact with heated steel belts occurs at the earliest possible moment simultaneously with the increase in pressure. Since the belt driving forces are introduced onto the belt via teeth with self-centering effect, the problem of band guidance does not occur. The rolling elements alternatingly guided by the spacer profiles and the circular gaps between teeth can be operated under favorable lubricating conditions and facilitate the transfer of heat into the panel of material. Differences in the rolling paths of the individual rolling elements, created by geometric inaccuracies lead to an increase in the slight pushing forces acting alternatingly between them and thus to an increase in pressure in the lubricating films between rolling element and spacer profile without there existing a danger of breakage of some part on the rolling path. Additionally, this increase in pressure produces a reaction force on the rolling elements which creates slip in the opposite direction and thus a tendency to compensate errors in movement.

It will be understood that the above description of the present invention is susceptible to various modifications, changes and adaptations, and the same are intended to be comprehended within the meaning and range of equivalents of the appended claims.

What is claimed is:

1. In a continuous laminating machine for exerting a pressure over an area on a moving panel of material, which machine includes a stationary supporting structure composed of two supporting elements, each supporting element presenting a parallel pair of planar outer faces and semicylindrical outer end faces extending between the planar faces, two steel pressing belts each supported by a respective supporting element and each disposed to press against a respectively opposite side of such a panel in the region of one planar outer face of a respective supporting element for applying such pressure thereto, bearing means providing a rolling bearing between each pressing belt and its respective supporting element, and clamping plates connecting the supporting elements together, the improvement wherein: said bearing means comprise a plurality of cylindrical rolling elements and a plurality of spacer profiles alternating with said rolling elements and provided with arcuate recesses adapted to the configuration of said rolling elements so that each spacer profile forms a slide bearing cup for one side of an adjacent one of said rolling elements, said rolling elements and spacer profiles being disposed between each said pressing belt and its respective supporting element such that the compression reaction forces produced by such a panel are transferred from said rolling elements under the influence of rolling friction to said supporting elements and into said clamping plates; said machine further comprises belt drive means including at least one hollow toothed wheel located in the region of a semicylindrical outer end face of one said supporting element arranged to be driven by a drive source and provided in the region of its periphery with frontal drive teeth; and a lateral edge of one of said steel pressing belts is provided with longitudinally spaced teeth meshing with said frontal teeth for driving said one belt.

2. A machine as defined in claim 1 further comprising, in the region of one semicylindrical end face of one said supporting element, two wheels each provided with gaps spaced regularly around its outer periphery, the spacing between gaps being identical in said two wheels, said two wheels being disposed at opposite sides of said one supporting element for supporting respective axial ends of said rolling elements with each end of a rolling element being held in a gap of a respective wheel such that the axis of each said rolling element is perpendicular to the direction of belt travel, and connecting means connecting said wheels together for rotation in unison to maintain such orientation of the axes of said rolling elements.

3. A machine as defined in claim 2 further comprising belt clamping means including a flexible plate disposed adjacent the planar outer face of one said supporting element which faces away from the region where pressure is exerted against a panel and movable against the portion of said steel belt adjacent thereto for urging that belt portion outwardly to clamp it in place.

4. In a continuous laminating machine for exerting a pressure over an area on a moving panel of material, which machine includes a stationary supporting structure composed of two supporting elements, each supporting element presenting a parallel pair of planar outer faces and semicylindrical outer end faces extending between the planar faces, two steel pressing belts each supported by a respective supporting element and each disposed to press against a respectively opposite side of such a panel in the region of one planar outer face of a respective supporting element for applying such pressure thereto, bearing means providing a rolling bearing between each pressing belt and its respective supporting element, and clamping plates connecting the supporting elements together, the improvement wherein: said bearing means comprise a plurality of cylindrical rolling elements and a plurality of spacer profiles alternating with said rolling elements and provided with arcuate recesses adapted to the configuration of said rolling elements so that each spacer profile forms a slide bearing cup for one side of an adjacent one of said rolling elements, said rolling elements and spacer profiles being disposed between each said pressing belt and its respective supporting element such that the compression reaction forces produced by such a panel are transferred from said rolling elements under the influence of rolling friction to said supporting elements and into said clamping plates; said clamping plates are provided with support surfaces inclined to said planar outer faces of said supporting elements and said supporting elements are provided with support countersurfaces parallel to, and engaging, said support surfaces; and said machine further comprises adjusting means including threaded spindles threadedly engaging said clamping plates for moving said clamping plates in mutually opposite directions in a manner to vary the spacing between said supporting elements over a continuous range.

5. A machine as defined in claim 1 or 4 wherein the region between one said steel belt and its respective supporting element comprises a shape compensating area filled with fluid pressure medium.

* * * * *